(12) United States Patent
Necsoiu et al.

(10) Patent No.: US 11,121,463 B2
(45) Date of Patent: Sep. 14, 2021

(54) VAN ATTA ANTENNA ARRAY WITH PATCH ELEMENTS AND SUBSTRATE INTEGRATED WAVEGUIDE

(71) Applicant: Southwest Research Institute, San Antonio, TX (US)

(72) Inventors: Dorel Marius Necsoiu, San Antonio, TX (US); Brad D. Moore, Boerne, TX (US); Emilio Martinez, Jr., San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 350 days.

(21) Appl. No.: 16/219,996

(22) Filed: Dec. 14, 2018

(65) Prior Publication Data

US 2020/0194887 A1    Jun. 18, 2020

(51) Int. Cl.
*H01Q 3/26* (2006.01)
*G01S 13/90* (2006.01)
*H01Q 21/06* (2006.01)

(52) U.S. Cl.
CPC ....... *H01Q 3/2647* (2013.01); *G01S 13/9023* (2013.01); *H01Q 21/065* (2013.01)

(58) Field of Classification Search
None
See application file for complete search history.

(56) References Cited

U.S. PATENT DOCUMENTS

| | | | |
|---|---|---|---|
| 6,657,580 B1 * | 12/2003 | Edwards | G01S 13/756 342/51 |
| 2016/0365638 A1 * | 12/2016 | Luk | H01Q 9/285 |

FOREIGN PATENT DOCUMENTS

WO     WO-9610277 A1 *   4/1996   ............. H01Q 13/20

* cited by examiner

*Primary Examiner* — Whitney Moore
(74) *Attorney, Agent, or Firm* — Livingston Law Firm

(57) ABSTRACT

A Van Atta antenna array comprising a number of antenna elements electrically connected to operate as a Van Atta antenna array and fabricated on and within a substrate. Each antenna element has a number of patch elements fabricated on the top surface of the substrate, with the patch elements being interconnected by substrate integrated waveguides. The antenna array provides a two-dimensional retro-reflective surface, which makes it especially suitable for InSAR monitoring of infrastructures.

11 Claims, 5 Drawing Sheets

VAN ATTA ANTENNA ARRAY WITH PATCH ELEMENTS AND SUBSTRATE INTEGRATED WAVEGUIDE

TECHNICAL FIELD OF THE INVENTION

This invention relates to monitoring infrastructure for structural integrity, and more particularly to using radar interferometry for such monitoring.

BACKGROUND OF THE INVENTION

Interferometric synthetic aperture radar, abbreviated InSAR, is a radar technique used in geodesy and remote sensing. This technique uses radar equipment to acquire multiple synthetic aperture radar (SAR) images. The radar equipment can be ground-based or carried on aircraft or satellite.

The images are used to generate maps of surface deformation, using differences in the phase of the waves returning to the radar equipment. InSAR mapping can potentially measure millimeter-scale changes in deformation over spans of days to years. It has applications for geophysical monitoring of natural hazards, for example earthquakes, volcanoes and landslides, and in structural engineering, in particular monitoring of subsidence and structural stability.

InSAR infrastructure monitoring requires high signal coherence. That is, the signals should have a constant phase difference and the same frequency, and the same waveform. For infrastructure monitoring, signal coherence can be influenced by various factors such as the material type (metal or concrete), design geometry (features such as right-angle plates can enhance radar returns), and positional geometry (bridge displacement orientation in regard to geometry of radar satellite acquisitions).

Another issue with InSAR infrastructure monitoring is collecting point data at specific sites of interest. For this reason, some InSAR systems use fixed markers, such as corner reflectors or radar transponders, which support obtaining accurate measurements at distinct locations.

For SAR and InSAR, there are several advantages of using corner reflectors or transponders as fixed markers. They obtain InSAR measurements at the exact location of interest. They are useful even if little or no archival data are available; InSar using relative measurements (DInSAR) can generate the results with as few as two images. Their typical ground displacement accuracy with DInSAR is on the order of centimeters, with multitemporal InSAR accuracy being in the order of millimeters.

Unfortunately, the installation of corner reflectors may not be practical or suitable for all locations because of constraints associated with site accessibility, orientation, ground condition, and theft/vandalism. Likewise, although radar transponders provide similar vertical precisions and are smaller in size and unobtrusive, their functionality depends on a reliable power supply. In addition, their cost is much higher than for corner reflectors.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to measuring displacement of infrastructures using radar interferometry and microwave retro-reflective arrays. The method can be also described as an application of retro-reflective radar tagging technology for the purpose of providing marker devices responsive to SAR (Synthetic Aperture Radar). The techniques discussed herein are especially suitable for InSAR performed with aircraft or satellites.

Figure 1:
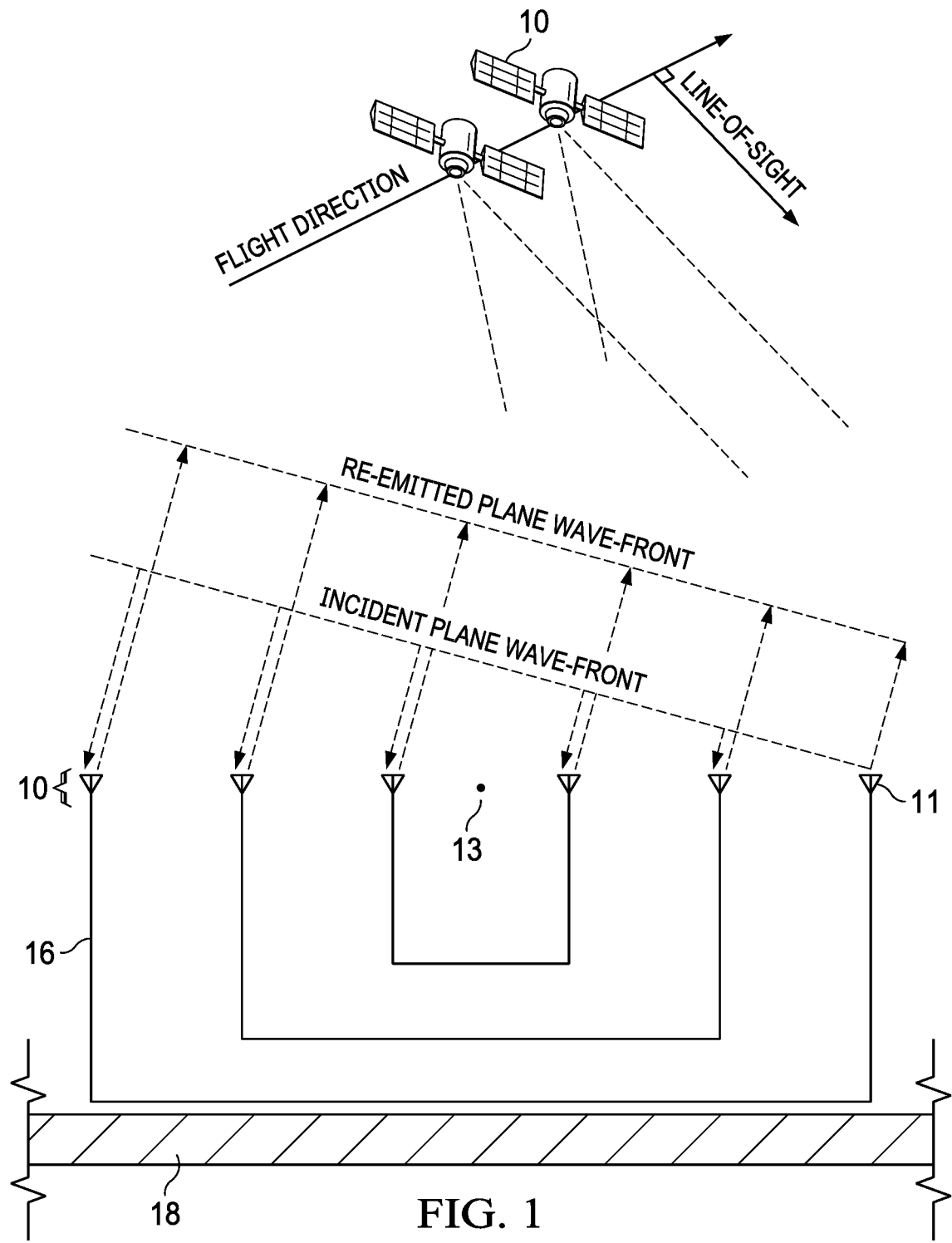
FIG. 1 illustrates the principle of operation of InSAR with a passive retro-reflective array.

FIG. 1 illustrates the principle of operation of InSAR with a passive retro-reflective array, using an airborne platform. A satellite 10 transmits pulses of microwave energy to the Earth's surface and records the amount of backscattered energy as "SAR images". Differential InSAR uses two SAR images of the same area acquired at different times. If the distance between the ground and satellite changes between the two acquisitions, a phase shift will occur.

A Van Atta antenna array 12 is used to reflect the satellite signal. The Van Atta antenna array 12 consists of interconnected antenna elements that reradiate received energy back in the direction of arrival for a large range of incidence angles. Array 12 is placed directly on the site of interest 18 and may be permanently attached.

Generally speaking, a Van Atta antenna array is a type of electromagnetic wave reflector having a plurality of antenna elements disposed in a symmetrical array relative to a geometric center. Symmetrically arranged pairs of the antenna elements are connected by appropriate transmission lines to produce retrodirective reradiation (or back "reflection") of electromagnetic waves incident on the array. In essence, wave portions or wavelets along a phase front of an incident electromagnetic wave within the angle of coverage of the array are received or absorbed by the antenna elements in their respective paths, converted to or guided as electrical energy which is fed through the associated transmission lines, and reradiated as a reflected wave from the connected antenna elements of the pairs back in the direction from which it originated. The equality of the path lengths of the wave portions between incident and reflected fronts of the wave is such that reflected energy is reinforced along the phase front.

In the example of FIG. 1, the Van Atta antenna array is a linear array comprising six antenna elements 11. These antenna elements are symmetrically oriented and interconnected in pairs about the array center, indicated as point 13. Transmission lines 16 are used to connect the pairs. The electrical length (phase delay) of the transmission lines 16 must be all equal or an integer multiple of each other. Satisfaction of these criteria enables the retro-reflection performance of the array.

In theory, a Van Atta antenna array produces a larger signal return than a similar size corner reflector and can be fabricated in a planar form, allowing conformal mounting to the infrastructure surface. This provides the additional benefits of preserving the aesthetics of the structure, being more robust with respect to weather (wind and snow load) and presenting a less noticeable target for vandalism.

Figure 2:
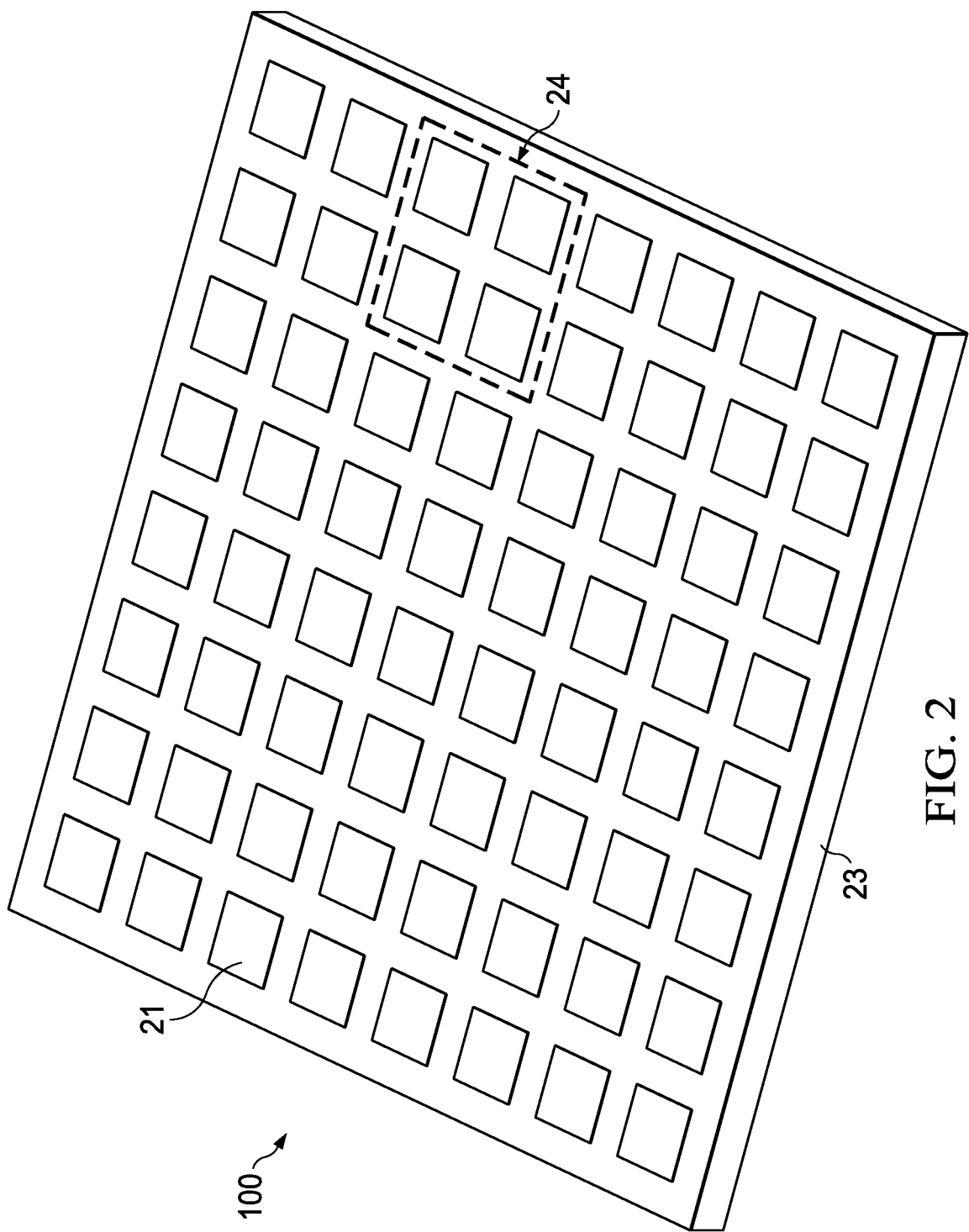
FIG. 2 is a top view of a patch configuration of a Van Atta antenna array in accordance with the invention.

FIG. 2 is a top view of a Van Atta antenna array 100 in accordance with the invention, and suitable for the application shown in FIG. 1. The top view of FIG. 2 is the view of the surface upon which microwaves will be received and then reflected. The entire configuration of array 100 is two-dimensional and planar.

An array of rectangular and planar microstrip patch elements 21 are connected for Van Atta operation, that is, in-phase reemission in the direction of the incident signal as described above. As explained below, in the example of this description, each antenna element 24 of array 100 comprises four patch elements 21.

Patch elements 21 are fabricated upon a layered substrate 23, which has both conductive and substrate (dielectric) layers. As explained below in connection with FIGS. 3-5, substrate 23 has integrated waveguides, which interconnect the patch elements 21 to become an antenna element 24.

In the example of FIG. 2, array 100 is a 9.7 Gigahertz array. It has 16 antenna elements 24, each having four patch elements 21. The number of antenna elements, as well as the number of patch elements per antenna element, may vary. The array gain and Radar Cross Section (RCS) are proportional to the number of antenna elements 24 in the array.

Further in this example, each antenna element 24 has dimensions of 1.8 inches square and 0.125 inches thick, with a gain of 11.0 dB, and HPBW (Half Power Beam Width) of 34 degrees. The spacing between patch elements 21 is 0.75 wavelength. However, these specifications are for purposes of example only, and many other configurations may be implemented.

Figure 3:
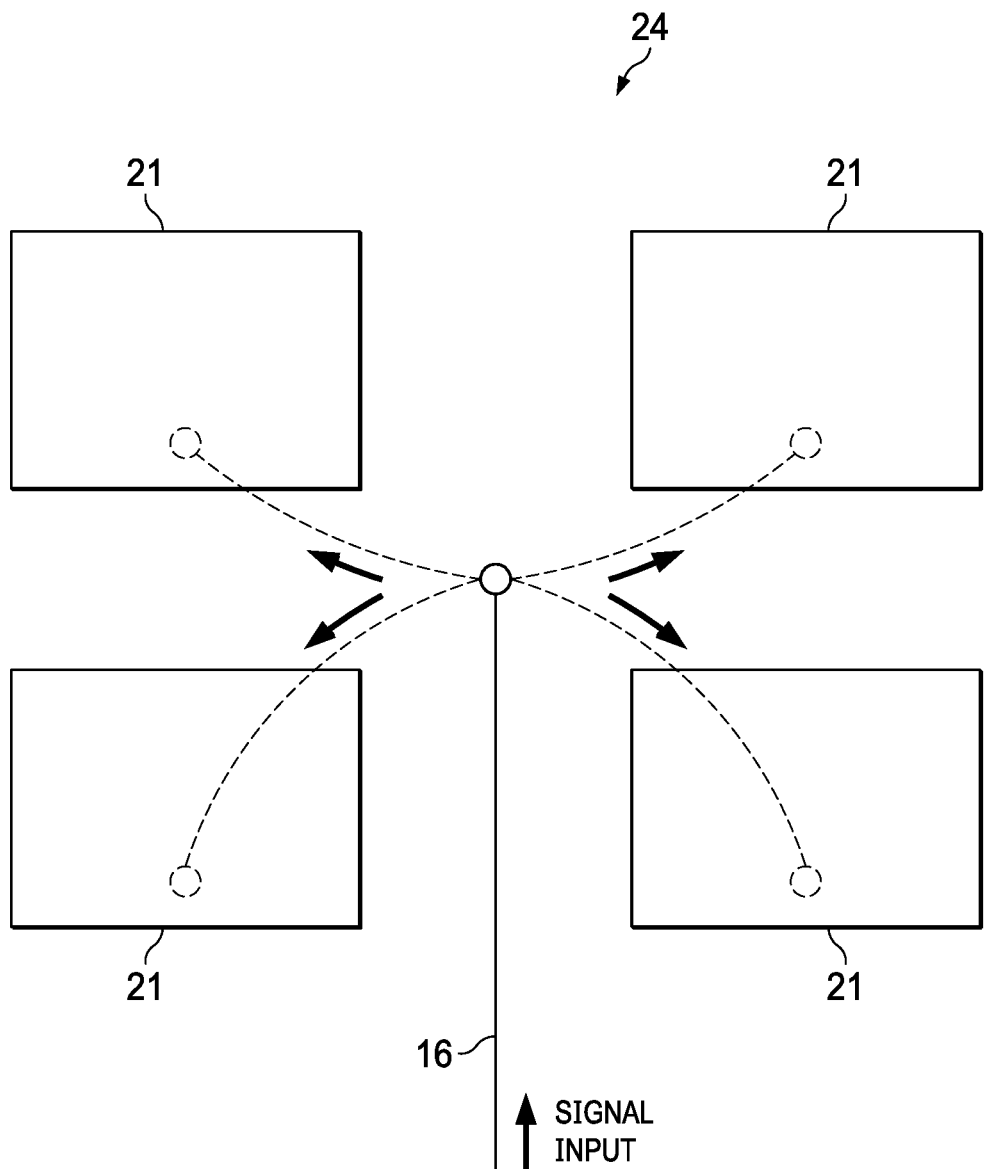
FIG. 3 is a schematic illustration of a single antenna element of array.

FIG. 3 is a schematic view of a single antenna element 24 of array 100. A working array, such as array 100, has many such antenna elements 24. As stated above, in the example of this description, each antenna element 24 comprises four patch elements 21. The use of multiple microstrip patch elements 21 for each antenna element 21 increases the antenna element gain and RCS, which improves the performance of array 100. In other embodiments, an antenna element could have any number of patch elements, provided they are fed in phase.

The antenna element 24 is fed by a substrate integrated waveguide, shown schematically in FIG. 3 and explained below in connection with FIGS. 4 and 5. In transmit mode, this waveguide splits the power received via signal input line 16 equally and in-phase to the four patch elements 21. In receive mode, the waveguide combines the signal received from each patch element 21 and sends the signal out to the input line 16.

Figure 4:
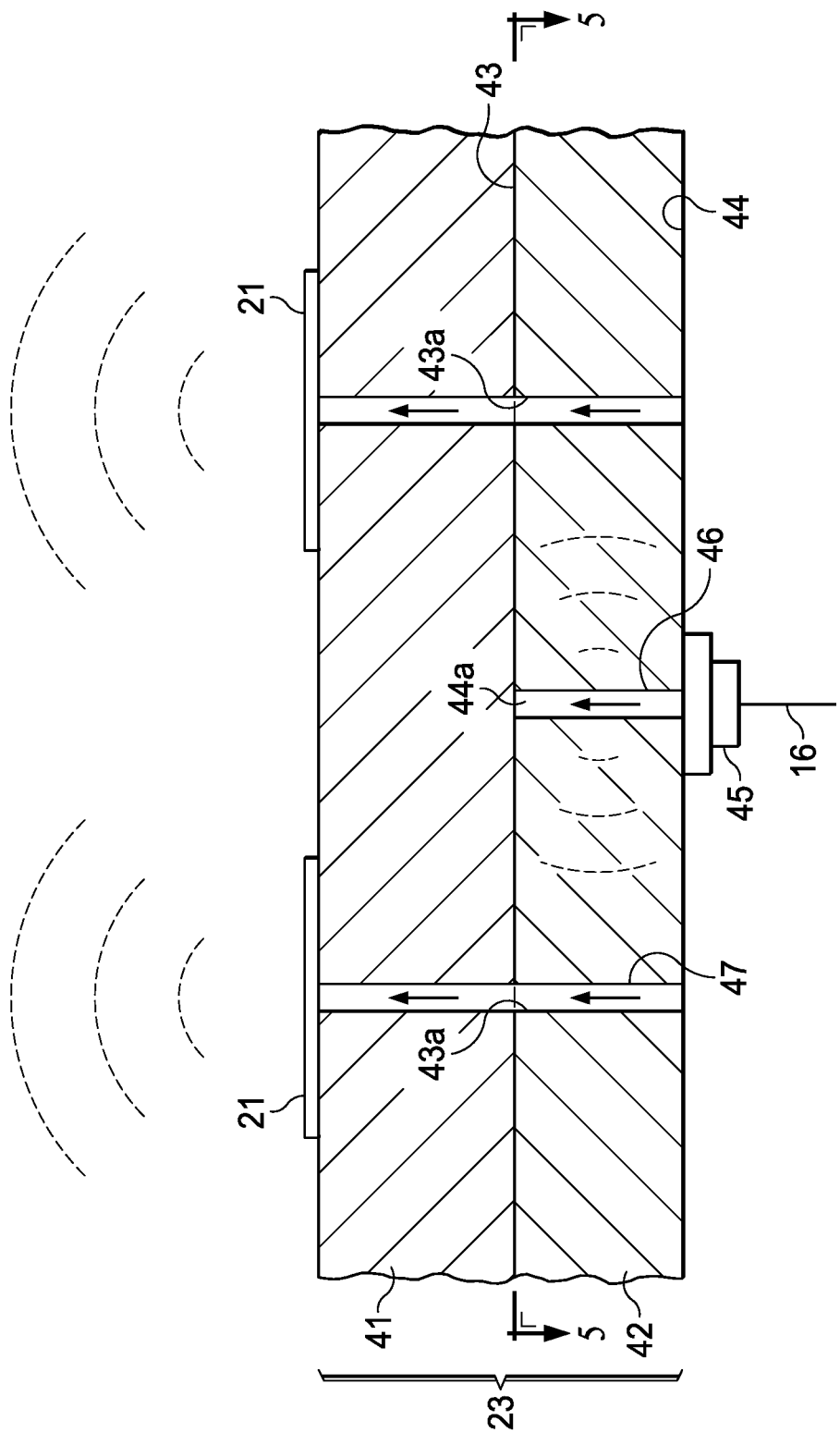
FIG. 4 is a side cross-sectional view of one of the antenna elements of the array of FIG. 2.

FIG. 4 is a side cross-sectional view of array 100, showing one of the antenna elements 24. In this view, two of the four patch elements 21 of antenna element 24 are visible. The arrows indicate signal flow in transmit mode; in receive mode, the arrows would point in the opposite direction.

Antenna element 24 is fabricated with two substrate layers (top substrate layer 41 and bottom substrate layer 42) and three conductive layers (middle ground plane 43, bottom ground plane 44, and the conductive layer comprising the patch elements). An example of a suitable material for substrate layers 41 and 42 is a PTFE (Polytetrafluoroethylene) material, such as RO3203, a material especially intended for use in commercial microwave and RF applications. An example of a suitable conductive material is copper.

For each antenna element 24, the middle ground plane 43 has four holes 43a for vias that feed the patch elements 21.

In other words, one hole 43a is associated with each of the four patch elements 21. The bottom copper layer 44 is a solid plane, except for one center hole 44a that is the signal feed point.

A connector 45 provides a connection for transmission input line 16 to stub 46. Typically, connector 45 is an SMA connector, but various other transmission input lines are possible. These transmission input lines could further be implemented within additional substrate layer(s) below ground plane 44. The signal radiates from stub via 46 within the substrate integrated waveguide. Stub 46 may be the center conductor of an SMA connector, but in general, any electrical connection may be made to stub via 46.

Through substrate layer 42, input line 16 is coupled to four waveguide vias 47 that feed the four patch elements 21. These vias 47 extend from the bottom ground plane 44 to the patch elements 21. Referring again to FIG. 3, these vias function as "wires" that couple each stub via 46 to its associated patch elements 21.

Figure 5:
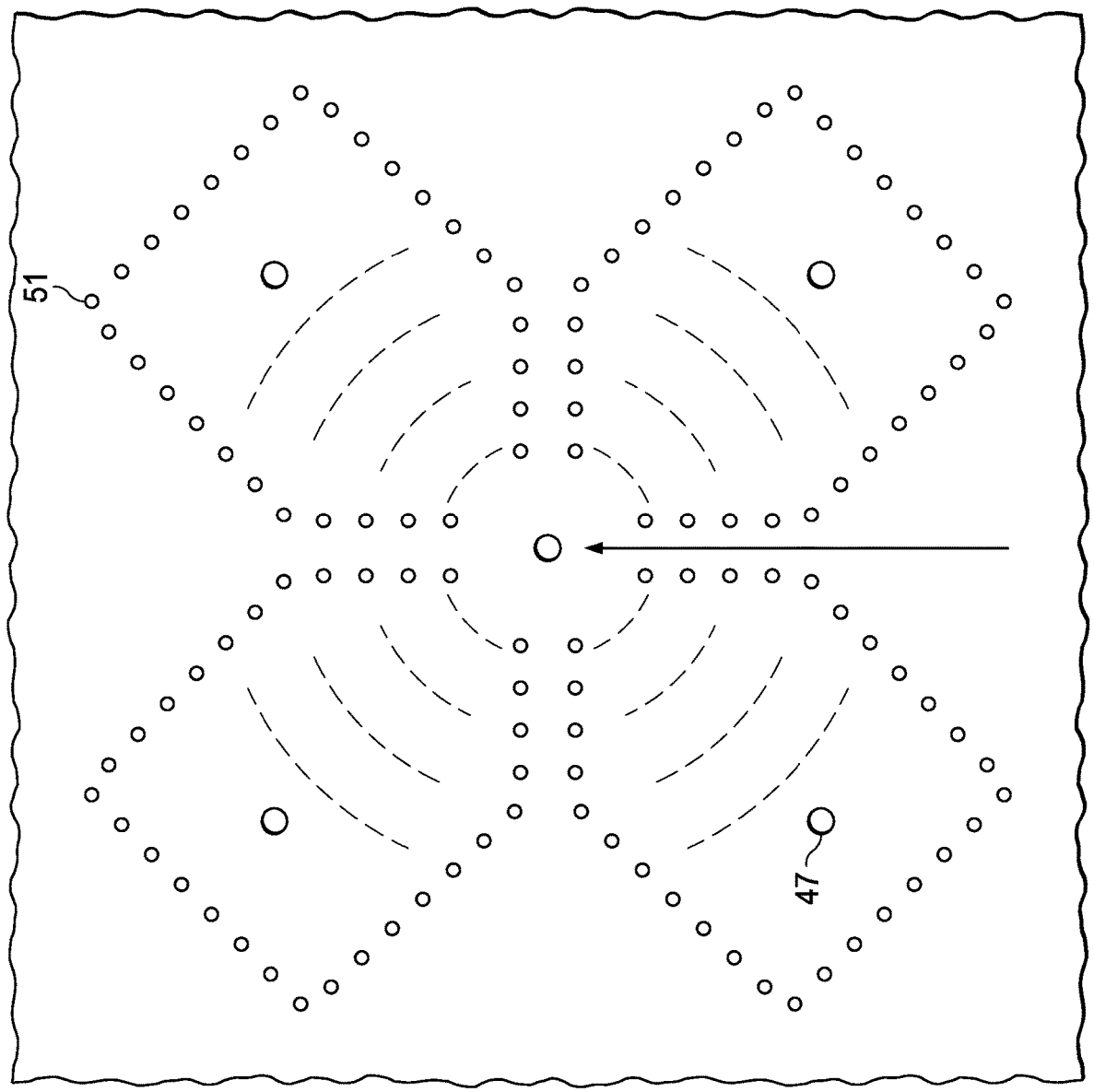
FIG. 5 is a mid-sectional view of one of the antenna elements of the array of FIG. 2.

FIG. 5 is a mid-sectional view of substrate layer 42, illustrating the power divider and waveguide network that are embedded within substrate layers 41 and 42. FIG. 5 is a section view just below middle ground plane 43. Thus, patch elements 21 are not visible in this view.

Referring to FIGS. 3-5, vias 47 transfer power to the microstrip patch elements 21 on the top of array 100. Thus, each via 47 is connected to both the ground plane 44 and a patch element 21.

For each patch element 21, smaller frame vias 51 in mid substrate layer 42 form a frame that defines the outline and dimensions of a waveguide. These vias extend between the mid ground plane 43 and bottom ground plane 44, such that they are embedded within substrate layer 42. For each patch element 21, its associated frame vias 51 generally surround the patch element except in the direction of the electrical stub 46, which is also the symmetric center of the antenna element.

In operation in transmit mode, an input signal is injected at the bottom of array 100 via connector 45 and signal line 16 into the radiating stub 46. Stub 46 connects to the mid-layer ground plane 43. Stub 46 radiates power toward the four vias 47 that feed the patch elements. This power is equally coupled into the four vias 47.

In receive mode, patch elements 21 receive the signal from space, the guide the signal through via 47. The signal radiates to stub 46. The signal from the four patch elements 21 is combined and routed to signal line 16.

Array 100 is a retroreflector in that it reflects the radar signal back to its source with a minimum of scattering. In a retroreflector, an electromagnetic wavefront is reflected back along a vector that is parallel to but opposite in direction from the wave's source.

Array 100 is also two-dimensional, as compared to other retro-reflectors that are three-dimensional, such as corner reflectors, which comprise a set of three mutually perpendicular reflective surfaces, placed to form the corner of a cube. The two-dimensional feature of array 100 allows it to be mounted flush to the surface of the infrastructure being monitored.

In operation, array 100 is placed as a fiducial on a large engineered structure. Examples of such structures are bridges, dams, and buildings, i.e., a "location of interest". InSAR monitoring is used to detect mechanical displacement. At least two different signal sets, acquired at different times, are acquired, and images derived from the signal sets. These images are compared to determine if there has been any displacement of the location of interest. This allows advance warning of pending structural failure and the need for maintenance.

What is claimed is:

1. A Van Atta antenna array, comprising:
a number of antenna elements electrically connected to operate as a Van Atta antenna array and fabricated on and within a substrate, with each antenna element being fed by an electrical stub;
wherein the substrate has a top substrate layer and a bottom substrate layer;
the antenna array further having a mid ground plane between the top substrate layer and the bottom substrate layer, and having a bottom ground plane under the bottom substrate layer;
wherein each antenna element comprises a number of patch elements fabricated on the surface of the top substrate layer, fed with the electrical stub associated with that antenna element and symmetric around the electrical stub;
wherein the patch elements of each antenna element are electrically interconnected with substrate integrated waveguides;
wherein a first substrate integrated waveguide of each antenna element is a via in electrical connection with an associated electrical stub, operable to radiate an electrical signal within the bottom substrate layer;
wherein a second substrate integrated waveguide of each patch element is a via extending from the bottom ground plane to that patch element, such that it receives the electrical signal radiated from the first substrate integrated waveguide and delivers the electrical signal to a patch element.

2. The antenna array of claim 1, further comprising a pattern of frame vias around each patch element extending from the bottom ground plane to the mid ground plane.

3. The antenna array of claim 1, wherein the second substrate integrated waveguides are a solid conductive material.

4. The antenna array of claim 1, wherein the antenna array is planar.

5. The antenna array of claim 1, further comprising a transmission line substrate, within which the electrical stubs and transmission lines are fabricated.

6. The antenna array of claim 1, wherein the antenna array provides a two-dimensional retro-reflective surface.

7. A method of performing InSAR monitoring of a location of interest, comprising:
placing an antenna array on the location of interest;
wherein the antenna array is configured as follows:
a number of antenna elements electrically connected to operate as a Van Atta antenna array and fabricated on and within a substrate, with each antenna element being fed by an electrical stub;
wherein the substrate has a top substrate layer and a bottom substrate layer;
the antenna array further having a mid ground plane between the top substrate layer and the bottom substrate layer, and having a bottom ground plane under the bottom substrate layer;
wherein each antenna element comprises a number of patch elements fabricated on the surface of the top substrate layer, fed with the electrical stub associated with that antenna element and symmetric around the electrical stub;
wherein the patch elements of each antenna element are electrically interconnected with substrate integrated waveguides;
wherein a first substrate integrated waveguide of each antenna element is a via, in electrical connection with the electrical stub, and operable to radiate an electrical signal within the bottom substrate layer;
wherein a second substrate integrated waveguide of each patch element is a via extending from the bottom ground plane to that patch element, such that it receives the electrical signal radiated from the first substrate integrated waveguide and delivers the electrical signal to a patch element;
receiving, with radar equipment aboard an aircraft, at least two reflected signal sets from the antenna array;
deriving an image from each signal set; and
comparing phases differences between the images.

8. The method of claim 7, further comprising a pattern of frame vias around each patch element extending from the bottom ground plane to the mid ground plane.

9. The method of claim 7, wherein the second substrate integrated waveguides are a solid conductive material.

10. The method of claim 7, wherein the antenna array further comprises a transmission line substrate, within which the electrical stubs and transmission lines are fabricated.

11. The method of claim 7, wherein the antenna array provides a two-dimensional retro-reflective surface.

* * * * *